United States Patent [19]

Metelow et al.

[11] 4,105,217
[45] Aug. 8, 1978

[54] SKI-SLED ATTACHMENT DEVICE

[76] Inventors: Victor Metelow, 72 Rutgers Ave.; Ivan Tirenin, 36 Fourth Ave. White Head Rd., both of Trenton, N.J. 08619

[21] Appl. No.: 801,190

[22] Filed: May 27, 1977

[51] Int. Cl.² .............................................. B62B 17/02
[52] U.S. Cl. ................................................. 280/28
[58] Field of Search ............................ 280/28, 11.18

[56] References Cited

U.S. PATENT DOCUMENTS

| 954,377 | 4/1910 | Bystrom | 280/28 |
|---|---|---|---|
| 2,016,187 | 10/1935 | Vincent | 280/28 |
| 2,824,746 | 2/1958 | Schummer | 280/28 |
| 3,578,351 | 5/1971 | McAtee | 280/28 |

FOREIGN PATENT DOCUMENTS 1,008,111  2/1974  Canada .................................. 280/28

Primary Examiner—Joseph F. Peters, Jr.
Assistant Examiner—Norman L. Stack, Jr.
Attorney, Agent, or Firm—Albert Sperry; Frederick A. Zoda; John J. Kane

[57] ABSTRACT

A ski-sled attachment device for use secured to the bottom of the runners of a conventional snow sled which includes a base member of a configuration similar to a conventional snow ski which is generally flat and extends longitudinally to be adapted to be detachably secured to a sled runner to provide a wide surface to facilitate sledding in soft snow, the base member including a forward section which may include laterally extending channels in the upper surface thereof to aid in upward flexing to facilitate conforming of the base member to the upwardly curved contour of a conventional sled runner, the device including a plurality of locking means positioned along the upper surface of the base member to detachably secure the base member to the sled runner, each locking means being formed by a pair of tab members extending upwardly from the upper surface of the base member to define therebetween a guide means to receive the sled runner, the tab members including a laterally defined aperture therethrough, the device further including a block means positionable with the guide means in between each set of tab members, the block means defining an angular elongated hole means therein and a groove means in the lower surface thereof to snugly mate with the upwardly extending surface of a conventional sled runner to facilitate securement thereof within the guide means.

11 Claims, 9 Drawing Figures

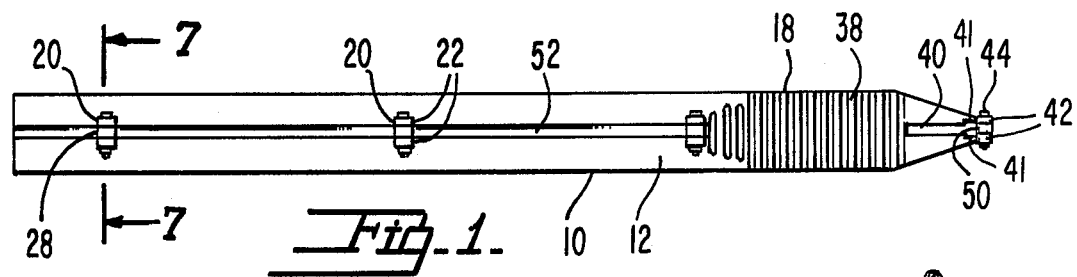
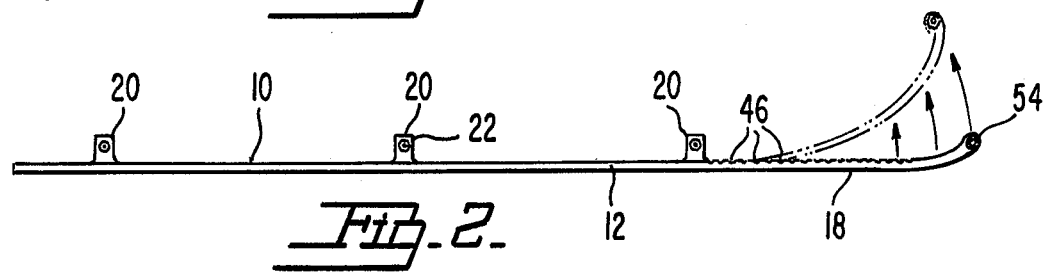
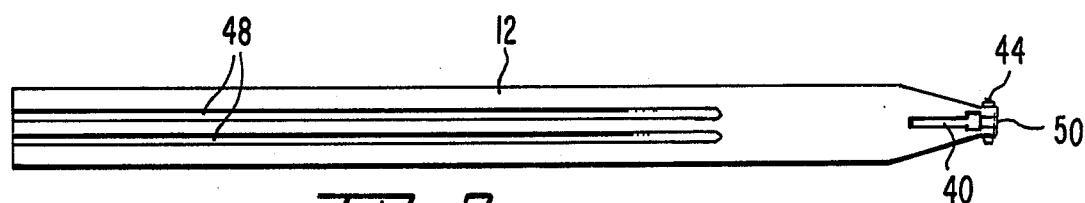
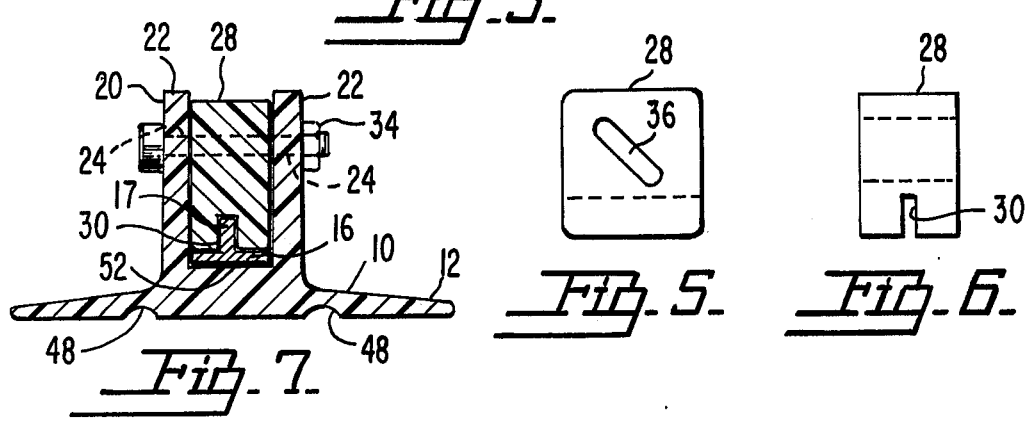
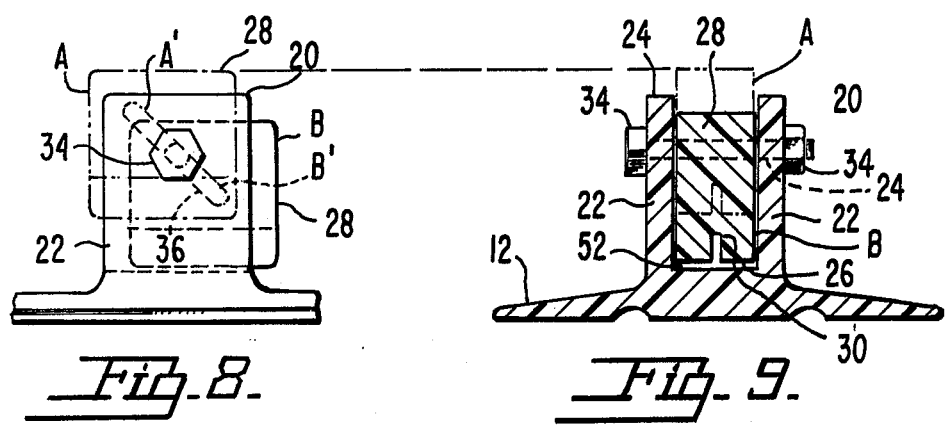

SKI-SLED ATTACHMENT DEVICE

BACKGROUND OF THE INVENTION

1. Field of the Invention

The present invention deals with the field of attachment devices for securement to the runners of conventional sleds to facilitate use of such sleds on soft and/or deep snow surfaces. It has been found that when utilizing a sled upon such soft surfaces the narrow width of the standard runners thereof inhibit full and efficient usage of the sled itself.

The present invention provides a means for utilizing the attachment of a ski-like member to each of the runners of a conventional sled to overcome this problem. The present invention particularly claims a unique locking means for providing a secure fixed attachment between such ski members and the runners of the sled. This locking means provides a simple and efficient and easily maintained means of securing firm interlocking attachment yet still allowing the simple removal of the ski members whenever usage in soft or deep snow is not needed. The present device also utilizes a simple locking means for securing firm attachment between the upwardly curved front section of the conventional sled runner and the forward section of the ski members or device of the present invention.

2. Description of the Prior Art

The usage of ski-like members for attachment to the runners of sleds is generally known in the prior art as evidenced by the following U.S. Pat. Nos.: 954,377, issued to J. Bystrom on Apr. 5, 1910; 3,578,351, issued to R. A. McAtee on May 11, 1971; and 3,751,057, issued to R. A. Matthiessen on Aug. 7, 1973. The locking means of the present invention illustrates particular advantages in the simplicity and easy maintainability thereof when considered in respect to the above patents and other prior art. In particular in U.S. Pat. No. 954,377 the spring clasp or fastening device which secures attachment between the ski member and the sled runner does not have the structural strength or easy maintenance qualities of the locking means of the present invention. Sled runners are utilized under very rough and demanding conditions due to the high speed and rough ground over which these conventional sleds often travel. As such the relatively complicated interlocking method disclosed in the '377 patent would not achieve the desired advantages of the simple interlocking single block design of the present invention. When an apparatus is put to such demanding usage the simplicity of design and ease of maintenance is a primary factor for consideration.

In U.S. Pat. No. 3,578,351 the locking means between the ski member and the sled runner utilizes at least two locking screws 34 at each locking location. The present invention utilizes only a single threaded locking member and, as such, is easier to manufacture and most importantly easier to maintain and install whenever desired at a sledding location. The U.S. Pat. No. 3,751,057 utilizes an elongated strip of sheet metal which is bent to provide a base. This ski member is formed with ears 19 of the base standing above the runner to interlock thereabove. The present design utilizes a simple flat base member which does not include the concave downwardly facing surface but achieves the desired control thereof by notches in the undersurface of the base member. Again the present design has advantages over this construction due to the ease of maintenance and simplicity in construction as well as the reduced cost of manufacture. Another important advantage of the present design over each of these patents and all other prior art is the ability to easily and simply secure the ski sled attachment device of the present invention to sled runners of any length or contour. That ability is achieved by the flexibility of the forward section and by the vertically adjustable characteristic of the locking means.

SUMMARY OF THE INVENTION

The ski sled attachment device of the present invention is usable secured to the bottom of the runners of the conventional snow sled and includes a base member which is generally narrow and approximately flat but extends longitudinally in order to be adapted to be detachably secured to the bottom of a conventional sled runner. The base member includes a forward section which is upwardly flexible in order to be adapted to be secured to the front portion of a sled runner which is normally tapered upwardly in an arcuate fashion. This flexibility may be achieved by the choice of a flexible material for the forward section or, in the alternative, for the entire base member or may be achieved by the placement of laterally extending channels in the upper surface of the forward section in order to facilitate flexing in an upward direction.

A plurality of locking means are utilized in the present device positioned along the upper surface of the base member in order to detachably secure the base member to a sled runner. Each locking means includes a pair of tab members which extend upwardly from the upper surface of the base member and define therebetween and above the base member a guide means in which the sled runner is adapted to be received. This guide means may include a longitudinally extending channel which is of lateral and longitudinal dimensions in order to accept snugly therein a conventional sled runner.

Each of the tab members associated with a particular locking means define transversely therethrough an aperture such that the aperture of one tab member is oriented axially with the aperture of its associated tab member within the same locking means. These apertures are adapted to receive therethrough a bolt means. A block means is included with each locking means being positionable between the tab members above the longitudinally extending groove to bias downwardly the sled runner positioned within the guide means. The block means includes a hole means extending laterally therethrough which is capable of orientation with the apertures of the associated tab members such that, when the bolt means is positioned extending through the apertures in the tab members, it also extends through the hole means of the block means and when firmly secured holds the block means against the upper surface of the sled runner. The block means will thereby hold the bottom surface of the sled runner within the guide means. The block means may include a groove means in the lower surface thereof to firmly interlock with the upwardly extending flange which is usually a part of the construction of a conventional sled runner. The plurality of locking means may each be adjustable by forming the hole means as an angularly elongated slot which is oriented obliquely with respect to the base member in order to allow variable distances between the guide means and the block means by choosing the bolt means to be protruding through the elongated slot at various locations. In this manner the firm attachment between the ski sled attachment device and the conventional snow sled is achieved regardless of variations in the vertical dimension of the sled runner. In this manner the device of the present invention is usable with sleds having runners with other than standard vertical dimensions.

The present invention may also include two laterally spaced and forwardly extending arms at opposite lateral sides of the forward edge to define an opening therebetween and to be adapted to flex upwardly above the sled runner to be located above the upper rail 17 of the sled with the rail extending through the opening. The arms may also define an orifice laterally therethrough above the sled upper rail 17 adapted to receive a stud means therethrough which will extend above the sled rail 17 which is protruding through the opening and thereby secure the forward section of the base member to the rail. To aid in minimization of wear of the stud means extending through the orifices, a spacer member of a generally tubular configuration may be positioned between the orifices about the stud means to minimize the metal-to-metal contact which would otherwise exist between the sled rail 17 and the bolt means as well as to provide the proper spacing.

It is an object of the present invention to provide a device for attachment to sled runners to increase the contact surface of the bottom of the sled runner and improve the sliding characteristics in soft and/or deep snow.

It is an object of the present invention to provide a device for securing to sled runners which provides a substantially greater load-bearing area than the narrower conventional runner such that the sled can be utilized on light or soft unpacked snow.

It is an object of the present invention to provide a ski-sled attachment device which is inexpensive to design and maintain.

It is an object of the present invention to provide a ski-sled attachment device which is simple to attach and remove from the runners of conventional sleds to facilitate usage in the field.

It is an object of the present invention to provide a ski-sled attachment device which is flexible in order to conform to the contour of any standard sled runner to aid in control during usage thereof.

It is a still further object of the present invention to provide an auxiliary runner of wider dimensions than a conventional runner which is adapted for usage with substantially any conventional sled design.

It is an object of the present invention to provide a ski-sled attachment device which includes an improved locking means which is simple to use when attaching or detaching the device to a sled runner.

It is an object of the present invention to provide a ski-sled attachment device including lateral channels in the upper surface of the front section thereof to facilitate upward flexing to the contour of a conventional sled runner.

It is an object of the present invention to provide a ski-like attachment device for the bottom of sled runners which is sturdy in construction and yet simple in design.

It is an object of the present invention to provide a ski-like member for attachment to sled runners which includes laterally extending notches in the lower surface thereof to facilitate control of the sled when utilized within soft or loosely packed snow.

It is an object of the present invention to provide attachment device for the bottom of sled runners which is easy to assemble by a simple bolt-on operation.

It is an object of the present invention to provide a ski-sled attachment device which may be formed of a plastic material to facilitate upward flexing thereof and to minimize cost thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a top plan view of an embodiment of the ski-sled attachment device of the present invention;

FIG. 2 is a front elevational view of the embodiment shown in FIG. 1;

FIG. 3 is a bottom view of the embodiment shown in FIG. 1;

FIG. 5 is a side view of an embodiment of a locking block of the present invention;

FIG. 6 is an end view of the embodiment shown in FIG. 5;

FIG. 7 is a cross-sectional view along lines 7—7 of FIG. 1;

FIG. 8 is a side view of an embodiment of the locking means of the present invention; and FIG. 9 is an end view of an embodiment of the locking means shown in FIG. 8 further illustrating the adjustable characteristic of the locking means.

DETAILED DESCRIPTION OF THE PREFERRED EMBODIMENT

Figure 4:
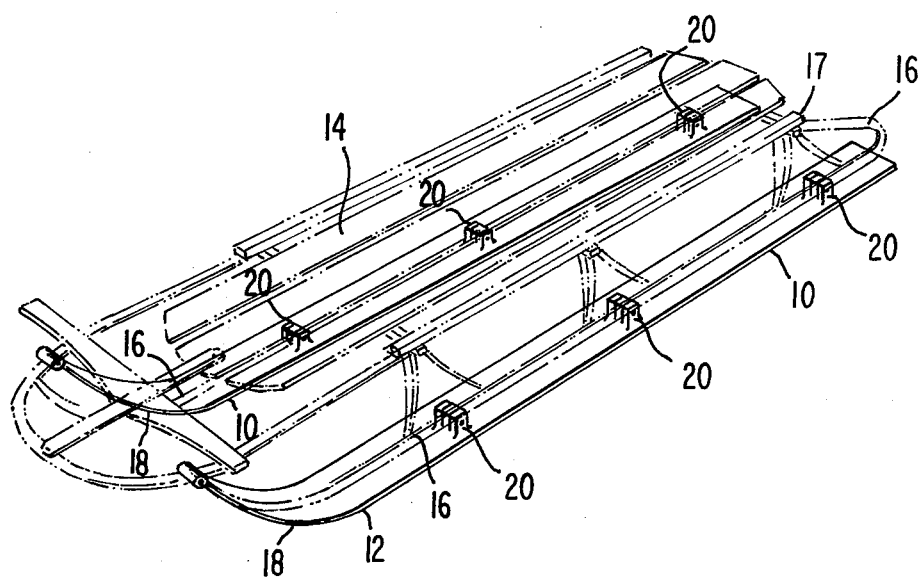
FIG. 4 is a perspective view showing an embodiment of the present device secured to a conventional sled.

The present invention provides a ski-sled attachment device 10 for use secured to the bottom of the runners 16 of a conventional sled 14. The device is configured including a base member 12 which is adapted to provide a wider contact surface between the sled runners and the sliding surface which is particularly useful with loosely-packed or deep snow conditions.

The base member 12 preferably includes a forward section 18 which is adapted to be secured to the front portion of a sled runner taking into consideration the variation in contour which is normally present in the front or forward areas of sled runners. Normally the forward area of sled runners are formed to taper upwardly in an arctuate fashion to a point of connection with the sled steering mechanism. The base member of the present design is constructed such that the forward section thereof is upwardly flexible to conform with this front contour of the sled runner. The upward flexing is achievable by forming the forward section from a flexible material such as plastic or the like or, alternatively, may be achieved by means of the positioning of longitudinally extending channels 52 shown best in FIG. 1 as configured in the upper surface of the base member 12 in order to provide this upward flexing characteristic.

To assure a firm securement between the ski-sled attachment device 10, and more particularly the base member 12 and the sled runner 16, a plurality of locking means 20 are positioned along the upper surface of base member 12. Each locking means 20 may include two tab members 22 formed as upwardly extending flange-like members defining apertures 24 extending laterally therethrough. Each of the apertures of each pair of tab members are laterally aligned or registered with respect to one another such as to receive a bolt means 34 therethrough.

Each pair of tab members 22 are in lateral spaced relation with respect to one another to define therebetween a guide means 26 adapted to receive therein a sled runner 16 having a conventional width. The guide means 26 of each pair of tab members 22 associated with each individual locking means 20 are in longitudinal orientation along the length of the base member 12 in order that the straight longitudinal dimension of the sled runner 16 will be accepted therein.

Each locking means 20 may also include a block means 28 which is positionable between the associated tab members 22. The block means 28 preferably defines therethrough in a transverse direction a hole means 32 which is registrable with the apertures 24 which are laterally defined to the tab members 22. In this manner a bolt means 34 can be located protruding through the apertures 24 of a pair of tab members 22 as well as protruding through the hole means 32 of the associated block means 28. With this configuration whenever a sled runner 16 is positioned in the guide means 26 the block means 28 may then be placed thereover to urge the sled runner 16 downwardly within the guide means 26. The bolt means 34 is then placed through the apertures 24 and the hole means 32 to bias the runner 16 downwardly into firm securement within the guide means 26.

Due to variations in the manufacture of the device 10 and particularly the location of the various apertures and locking means thereof as well as due to the variability in the vertical dimension of any conventional sled runner 16 it is preferable to provide the locking means 20 with an adjustable characteristic. In particular, the hole means 32 can be configured as an elongated slot means 36 which is best shown in FIGS. 5 and 8. As particularly shown in FIG. 8 the use of the elongated slot means 36 oriented obliquely with respect to the base member allows the bolt means to lock the block means at variable distances from the upper surface of the base member. In particular FIG. 8 shows the position A and position B of the block means 28 which is achieved by tightening the bolt means 34 at various chosen positions within the elongated slot means 36 which is achieved by moving the block means 28 with respect to the tab members 22. Position A is shown as the higher position which includes the elongated slot A' therein. Position B is shown as the lower position including the elongated slot B' therein. FIG. 9 shows an end view of these two extreme positions of location of the block means 28. To facilitate engagement between the block means 28 and the sled runner 16 a groove means 30 may be defined in the lower section of the block means 28 to be dimensioned to securely engage the runner flange 17 which is conventionally included in the upper configuration of a sled runner 16. Due to variations in the vertical dimension of this runner flange 17 the variation of position of the blocking means from position A to position B allows a variation in the vertical dimension from the base of the guide means 26 to the groove means 30 from dimension Y to dimension X, respectively. Dimension Y corresponds to the upper or A position and dimension X corresponds to the lower or B position.

The device 10 of the present design also preferably includes two laterally spaced and forwardly extending arms 38 at opposite lateral sides of the forward edge thereof which define an opening 40 therebetween. The arms are adapted to flex upwardly by means of the previously described flexing characteristics to extend above the runners and the upper rail 17 on opposite sides thereof to assure firm attachment between the base member 12 along the front section of the sled runner 16 in the area where the sled runner is curved upwardly. Preferably each arm shall extend upwardly above the runner and the runner shall extend through the opening 40. The arms 38 define laterally therethrough orifices 42 through which a stud means 44 is adapted to be placed to extend above the runner and thereby provide a securement means to prevent detaching of the forward section of the base member 18 from the forward section of the sled runner 16. To minimize metal-to-metal contact between the runner flange 17 and the stud means 44 a tubular spacer member 50 may be positioned about the stud means 44 and be formed of a bearing material to eliminate wear.

In order to facilitate control when steering a sled 14 which has the device 10 secured thereto, one or more notches 48 may be positioned in the under surface of the base member 12 extending longitudinally therealong to aid steering and sliding control.

To assure a firm securement between the sled runner 16 and the base member 12 the stud means 44 may be configured as a threaded bolt means 54 or the like to firmly hold the tubular spacer member 50 therebetween and force the base member 12 to be fixedly secured to the runner 16. Also to aid in the firm securement between the base member 12 and the runner 16 the guide means 26 may include a longitudinally extending channel 52 in the bottom surface thereof which is defined by the base member 12 and which is dimensioned such as to accept the usual lateral dimension of standard sled runner 16. With this configuration the block means 28 will bias the runner 16 downwardly into the longitudinally extending channel 52 to assure firm holding of the runner 16 therein.

One of the particular advantages of the present invention is the reversibility of each device 10 between the left and right runners of a sled. There is no left and right orientation and, as such, it is impossible to mistakenly confuse left and right orientation as with many previous designs.

To secure a device 10 to a runner 16 the block means 28 should be removed from each of the locking means 20 by removing of the bolt means 34 from the apertures 24. Also the stud means 44 should be removed from orifices 42 to allow the spacer member 50 to be removed from between arms 38. The device 10 is then ready to receive the placement of a sled runner 16 therein. Arms 38 are flexed upwardly to a position above the upwardly curved front section of the runner 16 and above rail 17 such that the runner and rail protrude through the opening 40. The user then aligns the tubular spacer member 50 with the orifices 42 and places stud means 44 therethrough and firmly secures the stud such that the stud and the tubular spacer member 50 are positioned above the rail 17. Then the sled runner is placed within the guide means 26 and firmly seated within the longitudinally extending channel 52 and the block means 28 associated with each individual locking means 20 is placed up between the associated tab members 22. Bolt means 34 is then placed through the apertures 24 and hole means 32 and a downward force is directed onto the top of block means 28 to assure firm attachment with the runner 16 and then the bolt means 34 is securely tightened by conventional means. This operation is performed with each individual locking means. In this manner the ski-sled attachment device 10 of the present invention will be securely fastened to the runners of sled 14 and the simple and easy installation has been completed. Reversal of the above-described operation will detach the device from the sled 14 in a similar simple fashion.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A ski-sled attachment device for use secured to the bottom of the runers of a conventional snow sled which comprises:
   (a) a base member extending longitudinally to be adapted to be detachably secured to a conventional sled runner, said base member further including a forward section adaped to be secured to the front portion of a sled runner;
   (b) a plurality of locking means positioned along the upper surface of said base member to detachably secure said base member to a conventional sled runner, said locking means comprising;
      (1) a plurality of pairs of tab members extending upwardly from the upper surface of said base member, each of said locking means including a pair of said tab members, each of said tab members defining an aperture therethrough in a transverse direction with respect to the base member, each of said apertures of a pair of said tab members being aligned laterally with respct to one another, each pair of tab means being in spaced relation with respect to one another to define a guide means therebetween for holding a sled runner therein to facilitate a firm attachment between said base member and a sled runner;
      (2) block means positionable within said guide means in between each pair of said tab members to lock a sled runner in place within said guide means between said block means and the upper portion of said base member, said block means defining a hole means laterally therethrough being alignable with respect to said apertures, said block means also defining a groove means in the lower surface thereof to snuggly mate with the upwardly extending surface of a conventional sled runner to facilitate securement thereof within each guide means; and
      (3) bolt means selectively locatable through said hole means and said apertures of a pair of said tab members to firmly hold said block means adjacent a sled runner within said guide means.

2. The device as defined in claim 1 wherein said locking means is adjustable by defining said hole means to be an angularly elongated slot oriented obliquely with respect to said base member to allow said bolt means to lock said block means at variable distances from the upper surface of said base member.

3. The device as defined in claim 1 wherein said base member includes two laterally spaced and forwardly extending arms at opposite lateral sides of the forward edge thereof, said arms defining an opening therebetween, said arms adapted to flex upwardly above the sled runner and upper rail to locate the runner and rail in said opening, each of said arms defining an orifice laterally therethrough above the sled upper rail and including a stud means adapted for placement through said orifices to hold said arms in locked position above the sled upper rail.

4. The device as defined in claim 1 wherein said forward section of said base member is upwardly flexible.

5. The device as defined in claim 4 wherein said forward section of said base member includes at least one laterally extending channel therein to facilitate upward flexing thereof.

6. The device as defined in claim 1 wherein said base member defines at least one longitudinally extending notch in the undersurface thereof to facilitate control of the sled.

7. The device as defined in claim 3 further comprising a tubular spacer member positioned within said opening and laterally aligned between said orifices to receive therethrough said stud means and maintain said arms in a fixed spaced relation with respect to one another.

8. The device as defined in claim 1 wherein said guide means includes a longitudinally extending channel in the upper surface of said base member to facilitate holding of the sled runner therein.

9. The device as defined in claim 1 wherein said base member is formed of a plastic material.

10. The device as defined in claim 3 wherein said stud means comprises a threaded bolt means to fixedly secure said forward section to a sled runner.

11. A ski-sled attachment device for use secured to the bottom of the runners of the conventional snow sled which comprises:
   (a) a base member extending longitudinally to be adapted to be detachably secured to a conventional sled runner, said base member defining a longitudinally extending channel centrally located in the upper surface thereof to facilitate firm securement of a sled runner thereto, said base member further including a forward section adapted to be sucured to the front portion of a sled runner, said front section defining a plurality of laterally extending channels in the upper surface thereof to facilitate upward flexing of said front section;
   (b) a plurality of adjustable locking means positioned along the upper surface of said base member to detachably secure said base member to a conventional sled runner, said locking means comprising:
      (1) a plurality of pairs of tab members extending upwardly from the upper surface of said base member, each of said locking means including a pair of said tab members, each of said tab members defining an aperture therethrough in a transverse direction with respect to said base member, each of said apertures of a pair of said tab members being aligned laterally with respect to one another, each pair of tab means being in spaced relation with respect to one another to define a guide means therebetween for holding the sled runner within said longitudinally extending channel to facilitate a firm attachment between said base member and the sled member;
      (2) block means positionable within said guide means in between each pair of said tab members to lock a sled runner in place within said guide means, said block means defining an elongated hole means laterally therethrough being alignable with respect to said apertures, said elongated hole means oriented angularly with respect to said base member to allow adjustment in the vertical distance from said base member to said block means, said block means also defining a groove means in the lower surface thereof to snugly mate with the upwardly extending section of a conventional sled runner to facilitate securement thereof within said guide means; and (3) bolt means selectively locatable through said hole means and said apertures of a pair of tab members to firmly hold said block means against a sled runner with said guide means;

(c) two laterally spaced and forwardly extending arms at opposite lateral sides of the forward edge of said base member, said arms defining an opening therebetween and being adapted to flex upwardly to be positionable above the sled upper rail allowing the rail to pass through said opening, said arms defining orifices therethrough and including a stud means adapted for placement through said orifices to hold said arms in locked position above the sled upper rail.

* * * * *